United States Patent [19]
Daly et al.

[11] Patent Number: 5,457,782
[45] Date of Patent: Oct. 10, 1995

[54] DIGITAL SIGNAL PROCESSING CIRCUIT BOARD HAVING USE FOR VOICE PROCESSING SYSTEM

[75] Inventors: Daniel F. Daly, Monroe; Thomas C. Grandy, Huntington; Mark N. Harris, New Haven; Salvatore J. Morlando, Easton; Mark Sekas, Orange; Shamla V. Sharma, Norwalk, all of Conn.

[73] Assignee: Dictaphone Corporation, Stratford, Conn.

[21] Appl. No.: 147,421

[22] Filed: Sep. 29, 1993

Related U.S. Application Data

[63] Continuation of Ser. No. 815,207, Dec. 31, 1991, abandoned.
[51] Int. Cl.⁶ ........................................................ G10L 9/00
[52] U.S. Cl. ................................................ 395/2; 395/2.1
[58] Field of Search ........................... 381/29–53; 395/2, 395/2.1; 379/372, 88, 89, 213, 212; 370/61, 85.1; 375/46

[56] References Cited

U.S. PATENT DOCUMENTS

| | | | |
|---|---|---|---|
| 4,549,047 | 10/1985 | Brain et al. | 370/61 |
| 4,799,144 | 1/1989 | Parruck et al. | 364/200 |
| 4,799,217 | 2/1989 | Garrett et al. | 395/325 |
| 4,907,225 | 3/1990 | Gulick et al. | 370/85.1 |
| 4,959,855 | 9/1990 | Daudelin | 379/213 |
| 4,975,941 | 12/1990 | Morganstein et al. | 379/212 |

OTHER PUBLICATIONS

European Search Report.
IEEE Journal of SiLiO–State Circuits, Aug. 1984 vol. SC–19 pp. 485–490 No. 4, "Peripheral Board Controller for Digital Exchange Systems", by Lerach et al.
"1985 Technology Forecast" by Frank Goodenough, Electronic Design, Jan. 1985 pp. 200–218.

Primary Examiner—Allen R. MacDonald
Assistant Examiner—Michelle Doerrler
Attorney, Agent, or Firm—Ronald Reichman; Melvin J. Scolnick

[57] ABSTRACT

A digital voice processing circuit board having use in a voice processing system wherein voice processing functions are run in software. This application of software allows a modular structure since the application software resides in boards that are coupled to a host computer. With this structure, the software can be updated as required and the capacity of the system can be expanded readily to meet increased needs. The digital voice processing board has an interface chip to which random access memories are connected for temporary storage of data and storage of the operating code for the voice processing card. The interface is in communication with an application processor which runs the application programming and database management. The application processor is in communication with and controls a pair of signal processors which are in communication with a time division multiplexer chip which in turn is in communication with the bus. The signal processors perform digital signal processing such as decoding control information, telephone processing, compression and decompression, and tone generation.

5 Claims, 3 Drawing Sheets

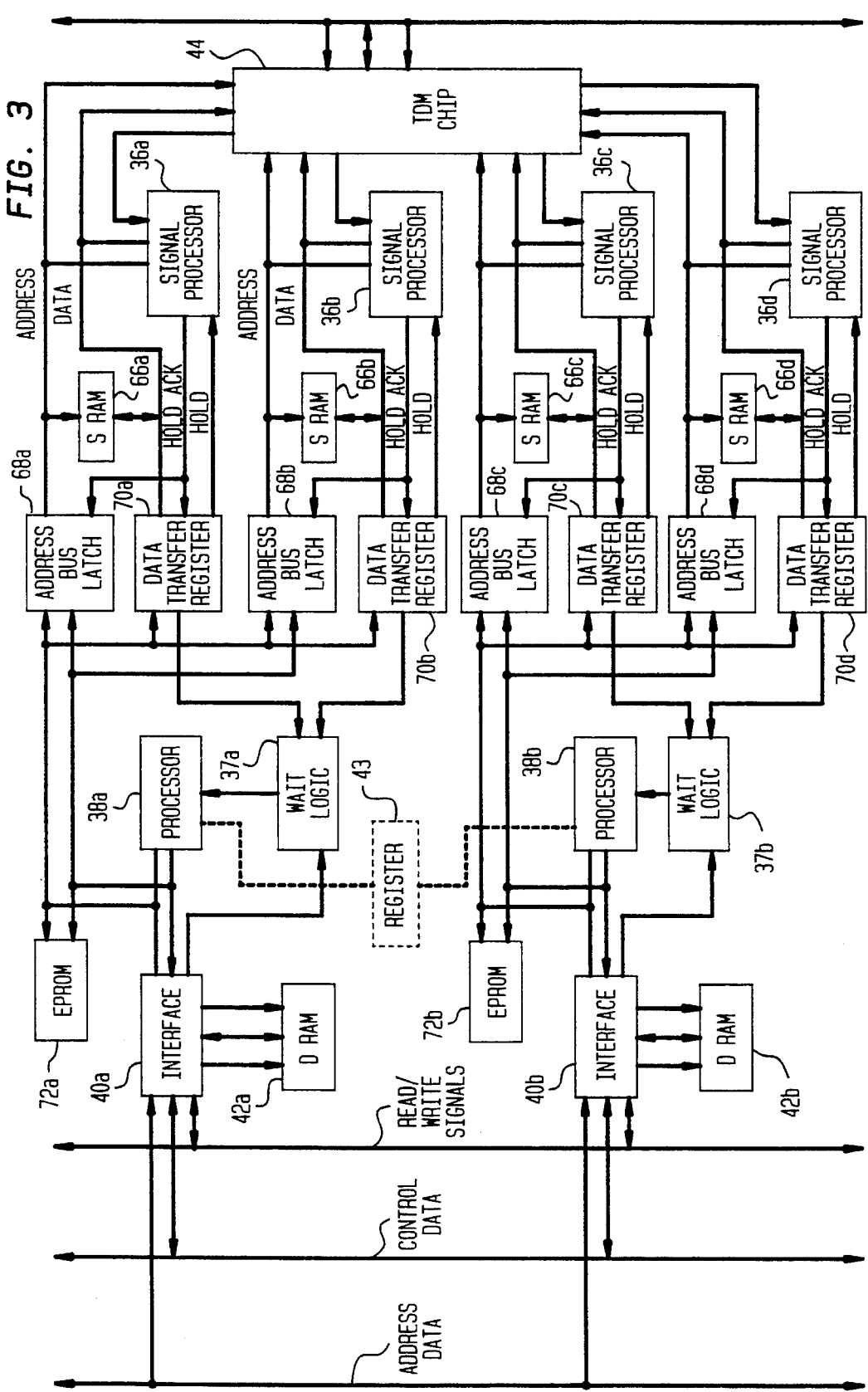

5,457,782

DIGITAL SIGNAL PROCESSING CIRCUIT BOARD HAVING USE FOR VOICE PROCESSING SYSTEM

This application is a continuation of application Ser. No. 07/815,207, filed Dec. 31, 1991.

BACKGROUND OF THE INVENTION

Digital voice processing systems as known that communicate with telephone systems to perform functions such as voice signal compression, voice signal storage and voice signal retrieval, automatic gain control, voice activated operation, telephone functions and the like. These functions are performed by such systems in hardware which is costly and inflexible. In addition, expansion of prior voice processing systems was difficult because of the need of additional hardware, not only because of the expense associated therewith, but also because of the geography factor, i.e., a larger footprint was required.

With the ever increasing change in technology, particularly software, it would be advantageous to be able to provide advanced software to a voice processing system so that the system can be quickly, conveniently and inexpensively expanded. In addition, it would be advantageous to provide a digital voice processing system that is capable of handling a large amount of incoming data and that can add capacity as required.

SUMMARY OF THE INVENTION

To achieve the above goals, a digital signal processing circuit board is required that can be run in software to perform the various applications required. A digital signal processing circuit board having use in a modular digital voice processing system has been conceived and developed wherein voice processing functions are run in software. With such a modular structure, units can be readily added or removed. A plurality of circuit boards of the instant invention is in communication with a host computer in a manner so that software can be changed as applications require. The voice processing circuit boards can perform digital voice processing, telephone signal processing and application processing signal compression, gain control and the like. The voice processing circuit boards are in communication with one or more audio circuit boards as well as with the host computer; such communication is achieved through a time division multiplexer (TDM) bus. Subsequent to the application processing taking place, data can be forwarded from the voice processing circuit board to the host computer for further processing and storage and can be retrieved therefrom.

The voice processing circuit board has essentially two independent circuits therein. Each circuit has a computer interface to which a random access memory (RAM) is connected for storage of voice data and storage of the operating code for the voice processing circuit board. Each interface is in communication with an application processor. The application processors run the application programming and database management. Each application processor is in communication with and controls a pair of signal processors. Each signal processor is in communication with a time division multiplexer (TDM) chip which is in communication with a TDM bus. The audio circuit boards are also connected to the bus and to the host computer. The signal processors perform digital signal processing such as decoding control information, telephone processing and tone generation. The signal processors monitor the audio circuit boards to determine which is active and needs servicing.

BRIEF DESCRIPTION OF THE DRAWING

FIG. 3 is a detailed block diagram of the voice processing circuit board shown in FIG. 1.

DETAILED DESCRIPTION OF THE PREFERRED EMBODIMENTS

Figure 1:
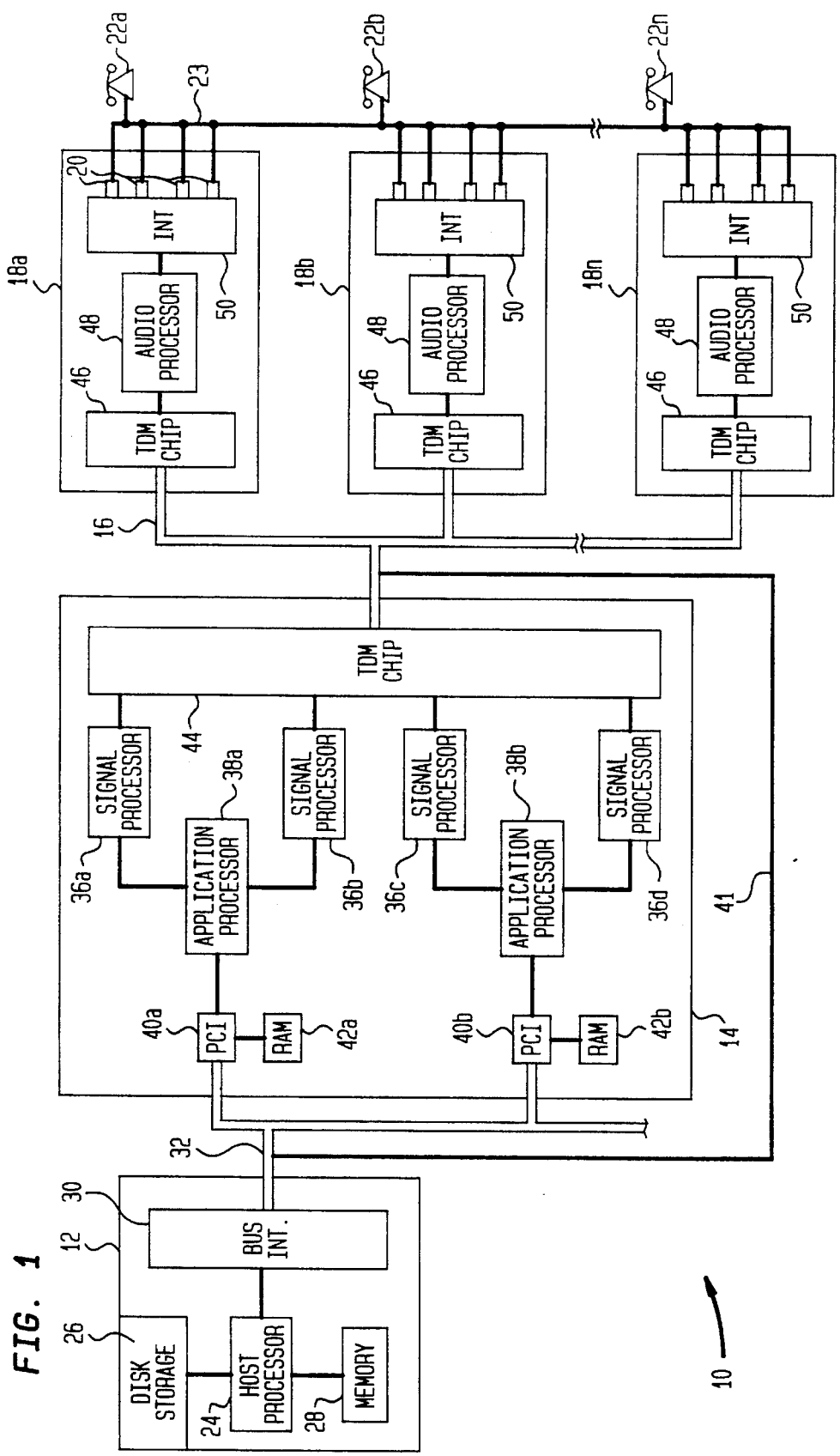
FIG. 1 is a block diagram of a system in which the instant invention can be practiced.
Figure 2:
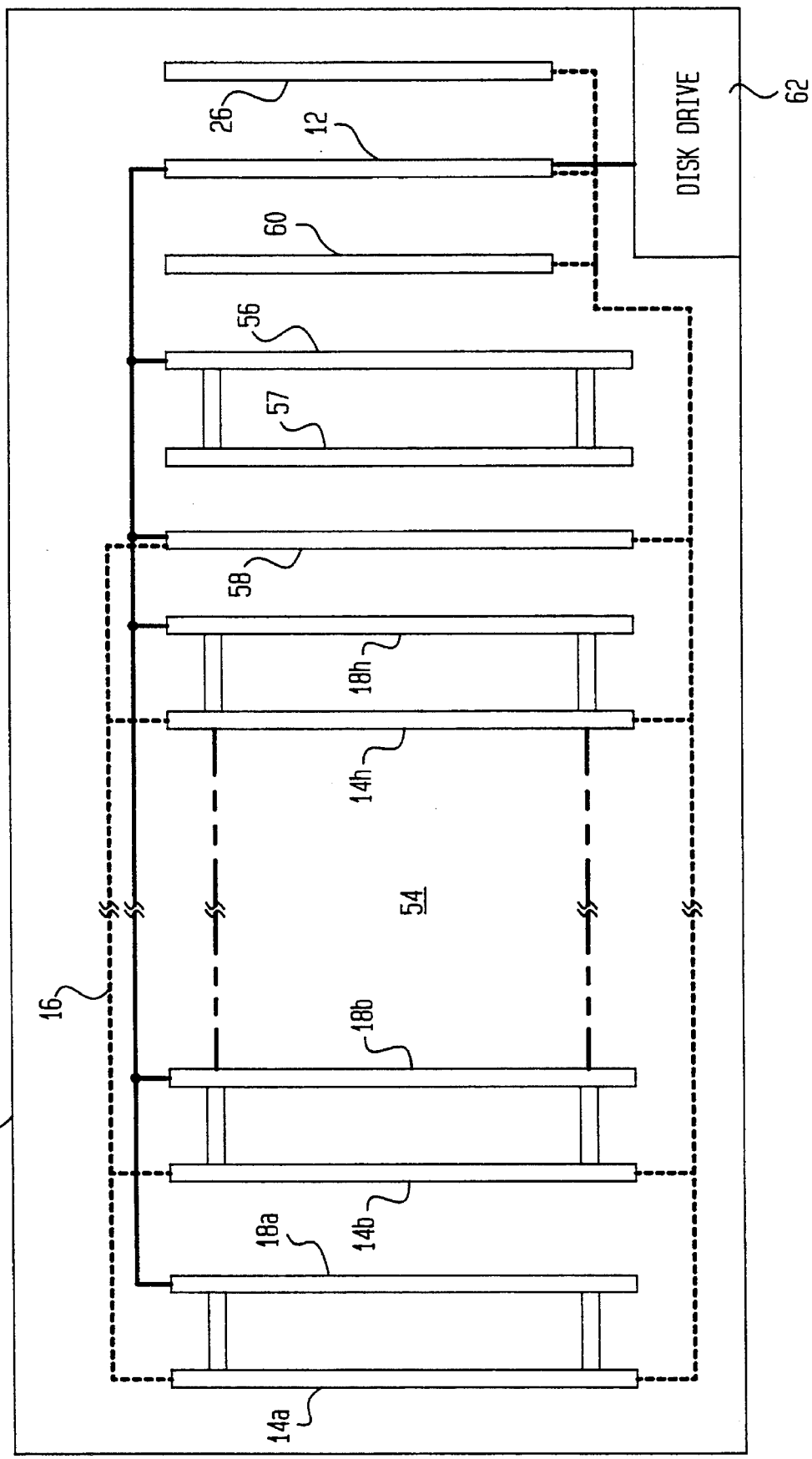
FIG. 2 is a planned view of the system shown in FIG. 1.

The preferred environment in which the digital signal processing board of the instant invention is given. With reference to FIGS. 1 and 2, a digital voice processing system is shown generally at 10 which has a host computer 12, the voice processing circuit board 14 which is the subject of this instant invention and a bus 16 that connects the voice processing circuit board to a plurality of audio circuit boards 18a, 18b . . . 18n. For purposes of convenience, the circuit boards 14 and 18 will be referred to as "cards". Each audio card 18a, 18b . . . 18n has a plurality of ports 20 through which communication can be had with a plurality of devices such as telephones 22a, 22b . . . 22n, 21a, 21b . . . 21n, PBX's, dictating machines and the like through telephone lines 23. The audio cards 18a, 18b . . . 18n also communicate with the host computer through a bus 41.

The host computer 12, which can be any of a number of commercially available computers such as an IEEE 996 Standard PC/AT, includes a processor 24, which is in communication with a disk storage 26, and a memory 28. The processor 24 is also in communication with a bus interface 30. The memory 28 is a volatile memory which receives the operating code for the system from the disk storage 26 on start up. The disk storage 26 acts as a storage medium for storing prompts, operating codes, directory information, systems information and diagnostics as well as other digital data of a long term nature that it can transmit to other memories in the system. Prompts are recorded messages, instructions and menus that are for the purpose of assisting a caller in the use of the voice processing system 10. The bus interface 30 provides communication between the processor 24 and the voice processing card 14 through a the system bus 32.

With reference to FIG. 3, the application processing card 14 has essentially two independent circuits therein which will be described simultaneously. Each such circuit has an interface (PCI) chip 40a, 40b to which a DRAM 42a, 42b, respectively, is connected for storage of data and storage of the operating code for the voice processing card 14. The interface chip 40 is the subject of a concurrently filed patent application having Ser. No. 07/816,516 and entitled Interface Chip for a Voice Processing System, contents of which are hereby incorporated by reference. Each interface chip 40a, 40b is in communication with a processor 38a, 38b, respectively, such as an Intel 80C 186. The processors 38a, 38b run the application programming and database management. The application processors 38a, 38b are in communication with one another through a register 43. Each processor 38a, 38b is in communication with and controls a pair of signal processors 36a and 36b and 36c and 36d, respectively, which may be TMS 320C25 processors from Texas Instruments. Each processor 36a–36d is in communication with a time division multiplexer (TDM) chip 44 which is in communication with the bus 16. The processors 36a–36d perform digital signal processing such as decoding control information, telephone processing and tone generation, and speech compression and expansion depending upon the direction of the data.

There are four static RAMs 66a–66d back in communication with the signal processors 36a–36d, respectively. Each SRAM 66 is loaded by the processors 38a and 38b. The SRAMs 66 load the signal processors 36 with routine diagnostics, application routines and also provide data space for the signal processors.

Address bus latches 68a–68d are in communication EPROMs 72a, 72b, the interfaces 40a, 40b, the SRAMs 60a, 60b and the TDM chip 44. Data transfer registers 70a–70d are in communication with the processors 38a, 38b through logic units 37a, 37b, and the signal processors 36a, 36d through data lines 69a–69d. The address bus latches and data transfer registers 68a–68d are part of the logic that allows the processors 38a–38b to control the SRAMs 66a–66d.

The processors 38a, 38b are configured such that each one controls two signal processor 36a–36d. The card 14 is designed to have the equivalent of two independent circuits such that if a line were drawn from the TDM chip 44 longitudinally across the center of the board, it appears as if there are two independent circuits. The major common element is the TDM chip 44.

The processors 38a, 38b have the responsibility for running the application programming, board management, database management and similar functions. The processors 38a, 38b are configured so that each runs from an EPROM 72a, 72b, respectively. The EPROMs 72a, 72b are in communication with the interfaces 40a, 40b, respectively. The interfaces are connected to DRAMs 42a, 42b respectively. This allows each processor 38a, 38b to have its own DRAM 41, and an EPROM 72 to enable it to be part of an independent circuit. Common between the two application processors 38a, 38b, however, is a very low duty cycle, low performance input/output register 43 which is to provide a diagnostics audit trail for run-time diagnostics failures such that operations of the processors 38a, 38b are logged into this input/output register 40a. In the event of a failure of one processor 38a, 38b, the second processor could read the information from the failed processor to determine the nature of any failure.

Each processor 38a, 38b interfaces to its DRAM 41a, 41b, respectively, through an interface 40, 40b which provides an interface through a bus 16 to the host computer 12.

The TDM chip 44 is shown and described in concurrently filed patent application having Ser. No. 07/816,414 and entitled Time Divide Multiplexer Chip and Process Thereof, which application is hereby incorporated by reference. The TDM chip 44 has dual internal SRAMs which operate in ping pong fashion to cause switching of the dual SRAMs on every frame sync. At any given instance, one SRAM of the TDM chip is interfaced with the signal processors 36a–36d and the other SRAM is interfaced into the TDM bus 16. The following description will be of the half of the TDM chip that interfaces with the signal processor 36a–36d.

The Static RAMs 66a–66d 109 serve as instruction area and data area for the signal processors 36a–36d and the communications path between the applications processors 38a, 38b and the signal processors 36a–36d. There are no storage elements in any of the processors 36, 38 other than the SRAMs 66a–66d.

In operation, when a call is made on one of the telephones 22a, it is received by the analogue interface 50 of one of the audio cards 18a. Although only the operation of one telephone 22a is given, it will be appreciated that any one of the telephones 22a, 22b, . . . 22n and any one of the audio cards 18a, 18b, 18n could be involved and would function in the same manner. The analogue interface 50 is a loop start type of interface and handles all telephone communications on a first come, first call basis. The analogue interface 50 converts incoming analogue signals to digital. A digital signal is sent over the bus 16 to the TDM chip 44. An available digital signal processor 36a–36d will monitor the status of the audio cards 18a–18n and when one of the audio cards 18 is activated, this will be determined by the signal processor 36a. Upon such activation being determined, the signal processor 36a will communicate such activity to an application processor 38a which will then control the signal processor to issue a command to the audio card, as for example, to go off hook. The audio card will then forward the incoming data over the bus 16 to the signal processor 36a where processing such as speech compression takes place. The data is forwarded to an application processor 38a where telephone processing, dictation, transcription, voice mail, voice response, medical records, applications and the like, takes place under control of the host processor 12 and designates memory locations to be occupied and acts as a traffic cop for data to and from the SRAMs of the TDM chip 44. Each processor 36a can run any of the different processing applications and can run two such applications simultaneously. Subsequent to the speech processing, data is then forwarded to the host computer 12 over the bus 32 by way of a PC interface 40a and it is subsequently forwarded to the processor 24. The processor 24 will access the disk storage 26 and will give specific control instructions to be communicated through the application processor 38. For example, a prompt may be given to the caller who will respond to such prompt through the telephone 22 keyboard. The sending of such prompt would be in reverse direction relative to the incoming data.

Thus what has been shown and described is a digital voice processing circuit board wherein voice signals can be processed in an efficient manner.

What is claimed is:

1. A digital voice processing circuit board comprising:

a) an application processor, b) an interface in communication with said application processor, c) a first memory in communication with said interface, d) a second memory in communication with said application processor and said interface, e) a pair of signal processors each in communication with said second memory, f) a third memory in communication with said application processor and said pair of signal processors, and g) a time divide multiplexer chip in communication with said signal processors.

2. A digital voice processing circuit board comprising:

a) an application processor, b) an interface in communication with said application processor, c) a first memory in communication with said interface, d) a pair of address bus latches in communication with said application processor and said interface, e) a second memory in communication with said application processor and said address bus latches, f) a pair of data transfer registers in communication with said application processor, g) a pair of third memories each of which is in communication with one of said address bus latches and one of said data transfer registers, h) a pair of signal processors, a first of which is in communication with a first one of said address bus latches, a first one of said data transfer registers and first one of said third memories, and the second signal processor connected to the second of said address bus latches, the second one of said transfer registers and the second one of said third memories, and i) a time division multiplexer chip in communication with said signal processors, said third memories and said address bus latches.

3. The digital voice processing circuit board of claim 2 further including a latch located intermediate said application processor and said data transfer registers to provide communication therebetween and intermediate said signal processing circuit board and said interface to provide communication therebetween.

4. A digital voice processing circuit board comprising:

a) a pair of application processors, b) a register in communication with said pair of application processors, c) a pair of interfaces, a first one of said interfaces in communication with a first one of said application processors and a second one of said interfaces in communication with a second one of said application processors, d) a pair of first memories, a first one of said first memories in communication with a first one of said application processors and a first one of said interfaces and a second one of said first memories in communication with said second one of said application processor and said second one of said interfaces, e) two pairs of address bus latches, a first pair of said address bus latches in communication with said first one of said application processors and said first one of said interfaces, and the second pair of said address bus latches in communication with said second one of said application processors and said second one of said interfaces, f) two pairs of data transfer registers, a first pair in communication with said first one of said application processors and a second pair of said data transfer registers in communication with said second one of said application processors, g) two pairs of second memories, a first pair of said pairs of second memories in communication with said first pair of said pair of address bus latches and said first pair of said pair of data transfer registers on a one to one basis, and the second pair of said pairs of second memories in communication with said second pair of said pairs of said address bus latches and said second pair of said pairs of date transfer registers on a one to one basis, h) two pairs of signal processors, a first pair of said signal processors in communication with said first pair of said pairs of address bus latches, said first pair of said pairs of data transfer registers and said first pair of said second pairs of memories on a one to one basis, and said second pair of said signal processors in communication with said second pair of said address bus latches, said second pair of said data transfer registers and said second pair of said pairs of second memories on a one to one basis, and, i) a time division multiplexer chip in communication with said two pairs of signal processors, said two pairs of second memories and said two pairs of address bus latches.

5. The digital voice processing circuit board of claim 4 further including a pair of wait logic latches, a first of said wait logic latches in communication with said first one of said application processors and said first pair of said data transfer registers and a second of said pair of wait logic latches in communication with said second one of said application processors and second pair of said data transfer registers, and a register in communication with said pair of application processors.

\* \* \* \* \*